United States Patent Office 2,803,414
Patented Aug. 20, 1957

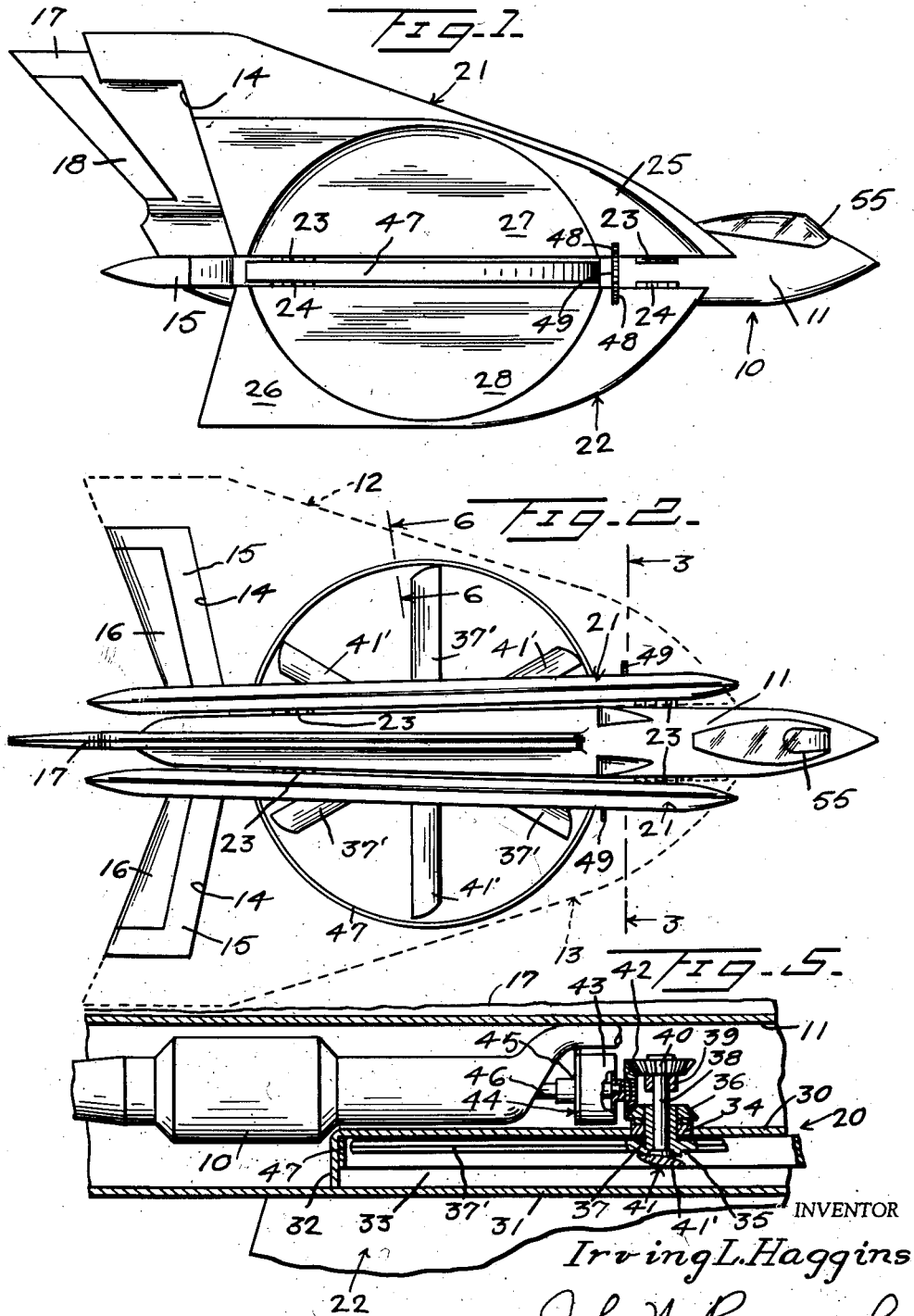

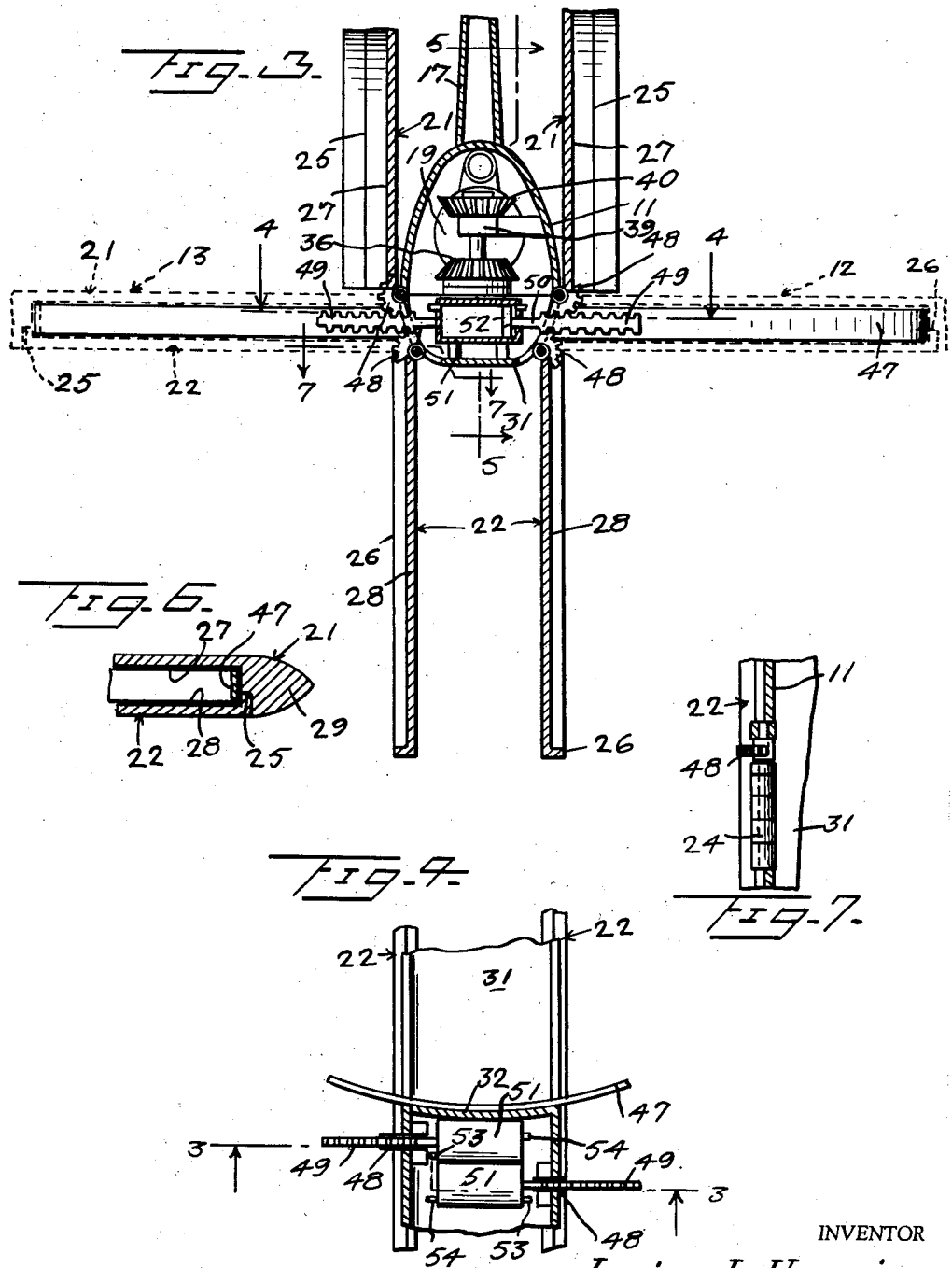

2,803,414

CONVERTIBLE AIRCRAFT

Irving L. Haggins, Washington, D. C.

Application August 27, 1956, Serial No. 606,338

6 Claims. (Cl. 244—7)

This invention relates to a novel convertible aircraft and more particularly to a helicopter unit for use with an airplane and which is so constructed and so mounted in the airplane that it will not adversely affect the normal horizontal movement of the aircraft as an airplane.

Modern high speed airplanes of both the jet propelled and propeller driven types are usually constructed with a relatively small wingspread or wing area so that greater speeds may be obtained. Such airplanes have the decided disadvantage of being required to land and take-off at very high speeds involving considerable danger and requiring large airfields.

Accordingly, it is a primary object of the present invention to provide an aircraft which can utilize a small wingspread or wing area so that the desired high speeds may be obtained and which aircraft is additionally equipped with a helicopter unit adapted to be utilized to effect substantially vertical movement of the aircraft for taking off and landing, so that such operations can be accomplished at very slow speeds and on a very small landing field or area of a type which could normally be utilized only by a helicopter.

Still a further and primary object of the present invention is to provide a novel structure whereby the helicopter unit when not in use can be completely enclosed within the fuselage and wing structure of the aircraft without modifying the exterior size or shape of said parts, so that the aerodynamic characteristics of the aircraft will not be adversely affected by the helicopter unit nested therein when the aircraft is operating in a conventional manner as an airplane.

Still a further object of the invention is to provide an aircraft of the aforedescribed character the wings of which are constructed to be moved relative to the fuselage to a position for exposing a substantial part of the helicopter unit so that said unit when operated can function to sustain the aircraft and to effect vertical ascending or descending movement thereof.

Still a further object of the invention is to provide an aircraft wherein the wings are disposed substantially vertical when the helicopter unit is in operation and when so disposed will function as torque neutralizers to prevent turning of the aircraft about a vertical axis.

Various other objects and advantages of the invention will hereinafter become more fully apparent from the following description of the drawings, illustrating a presently preferred embodiment thereof, and wherein:

Figure 1 is a side elevational view showing an aircraft constructed in accordance with the invention and with the wings thereof opened for operation of the helicopter unit;

Figure 2 is a top plan view thereof;

Figure 3 is an enlarged fragmentary cross sectional view taken substantially along a plane as indicated by the lines 3—3 of Figures 2 and 4;

Figure 4 is a fragmentary horizontal sectional view taken substantially along a plane as indicated by the line 4—4 of Figure 3;

Figure 5 is a fragmentary longitudinal vertical sectional view, taken substantially along a plane as indicated by the line 5—5 of Figure 3 and on a reduced scale;

Figure 6 is an enlarged fragmentary vertical sectional view taken substantially along a plane as indicated by the line 6—6 of Figure 2 and showing portions of one of the wings in a closed position, and Figure 7 is a fragmentary horizontal sectional view taken substantially along a plane as indicated by the line 7—7 of Figure 3.

Referring more specifically to the drawings, for the purpose of illustrating a preferred embodiment of the invention, an airplane designated generally 10 is illustrated in the drawings having a long slender fuselage 11 from opposite sides of which project the wings 12 and 13. The wings 12 and 13 are shown in dotted lines in top plan in Figure 2 and are of a generally conventional shape in outline, being of a length as measured longitudinally of the aircraft 10 greater than their expanse as measured crosswise of the aircraft. The trailing ends of the wings 12 and 13 are provided with notches 14 in which the stabilizer 15 is accommodated. Said stabilizer 15 is fixed to the rear portion of the fuselage 11 and is provided with the usual aileron 16. The direction of travel of the aircraft 10, when moving substantially horizontal, is controlled by the vertical fin 17 which is fixed to and rises from the top of the fuselage 11, and by the rudder 18.

The aircraft 10 can be equipped with any suitable power source or prime mover and may be either jet propelled or propeller driven. The aircraft 10 is herein disclosed as driven by a turbo-jet type power source 19 disposed within the rear portion of the fuselage 11, as seen in Figure 5. The parts previously referred to, except for the detailed construction of the wings 12 and 13, which will hereinafter be described, are all of conventional design and have been illustrated and briefly described merely to illustrate one application and use of the helicopter unit, designated generally 20 and comprising the invention.

The actual construction of the wings 12 and 13 constitute a part of the helicopter unit 20. Each wing 12 and 13 comprises an upper section, designated generally 21, and a lower section, designated generally 22. The wing sections 21 and 22 of each wing 12 and 13 are swingably mounted on the sides of the fuselage 11 by hinges 23 and 24, respectively. The hinges 23 of each upper wing section 21 are disposed above and spaced from the hinges 24 of the lower wing section 22 of the same wing. Each upper wing section 21 is somewhat wider and longer than the complementary lower wing section, as measured transversely and longitudinally, respectively, of the aircraft 10. The inner or under sides of the upper wing sections 21 are recessed, as seen at 25 in Figure 1, and said recessed areas 25 conform in size and shape to the lower wing sections 22, upper or inner surfaces 26 of which are adapted to fit flush against the recessed portions 25 when the two wings 12 and 13 are disposed substantially coplanar, as illustrated in the fragmentary view, Figure 6. The inner surfaces 25 and 26 of the wing sections 21 and 22 of each wing are also provided with complementary substantially semioval shaped recessed portions 27 and 28, respectively, which are disposed in opposed relation to one another when the wing sections are closed and in substantially a horizontal position, as illustrated in dotted lines in Figure 2 and in full lines in Figure 6. The wings 12 and 13 when disposed in substantially horizontal planes and substantially coplanar and with the sections thereof closed, as seen in Figure 6, appear in elevation to be of conventional shape since the under or outer sides of the lower wing sections 22 are disposed flush with the under sides of the marginal edge portions 29 of the upper wing sections 21. It will also be noted that the notches 14 are formed entirely on the upper wing sections 21, as seen in Figure 1.

The fuselage 11 is provided with a horizontal partition wall 30 which is disposed above and spaced from a portion 31 of the fuselage bottom. Said horizontal partition wall 30 has down turned ends 32 which join with said bottom portion 31 to form a relatively long narrow chamber 33 which opens outwardly of both sides of the fuselage 11.

A bearing 34 is mounted in the horizontal partition wall 30 for journaling a hollow shaft 35 to the upper end of which is secured a bevel gear 36 which is located within the fuselage 11 above and adjacent the partition wall 30. The lower end of the shaft 35 is fixed to the central portion or hub of a rotor 37 a part of which is disposed within the chamber 33, beneath and adjacent the partition wall 30. A shaft 38 has a portion extending through and journaled in the hollow shaft 35 and is supported by and journaled in the bearing 39, which is disposed in and supported by the fuselage 11 above the bevel gear 36. A bevel gear 40 is fixed to the upper end of the shaft 38 and bears on the upper side of the bearing 39 to support the shaft 38 therein. A rotor 41 is fixed to the lower end of the shaft 38 and is disposed partially within the chamber 33, beneath the rotor 37.

A bevel gear 42 is disposed in mesh with the bevel gears 36 and 40 and is supported by an outer section 43 of a clutch 44, such as a multiple disc clutch, the inner section 45 of which is mounted on and keyed or splined to an end of a drive shaft 46 forming a part of and which is rotatably driven by the power source 19. The shaft 46 has a forward end extending from the casing of the power source 19 to which the clutch 44 is connected.

A guard ring or band 47 has diametrically opposite portions thereof disposed against and suitably secured to the inner sides of the end walls 32 of the chamber 33. Said guard ring 47 is of a diameter so that the rotors 37 and 41 may revolve freely therein, and fits snugly within the cavities 27, 28 of the wings 12 and 13 when said wings are closed, as seen in Figure 6 and in dotted lines in Figure 3.

The rotors 37 and 41 each preferably comprise three equally spaced airfoils or blades 37' and 41', respectively. The airfoils 41' are pitched in the opposite direction to the airfoils 37'. Said rotors are revolved simultaneously in opposite directions so that the torque pull of each rotor is neutralized by the torque pull of the other rotor to minimize the tendency of the aircraft 10 to turn about a vertical axis when the wings 12 and 13 thereof are opened, as seen in Figures 1 to 3, and the rotors 37 and 41 are revolving. Said rotors are revolved in a direction so that a lifting effect will be accomplished thereby for causing the aircraft 10 to ascend, to maintain the aircraft hovering aloft, or to regulate and check descent of the aircraft.

Suitable means is provided for forceably moving the wing sections of the two wings simultaneously between open and closed positions, as seen in full and dotted lines, respectively, in Figure 3, and for maintaining the wing sections in either position. Such means may include pinion segments 48 fixed to the wing sections and having centers disposed in alignment with the axes about which said wing sections swing. The two pinion segments 48 of the two sections of each wing mesh with a double rack bar 49. The rack bars 49 form extensions of piston rods 50 which extend slidably through opposite ends of cylinders 51 and which are fixed to pistons 52 which are slidably disposed in said cylinders. A hydraulic medium or a pneumatic medium under pressure can be supplied from a suitable supply source, not shown, simultaneously to opposite ends of the cylinders 51 through nipples 53, causing the pistons 52 to exert a pull on the piston rods 50 and the racks 49 for turning the pinion segments 48 simultaneously for swinging the wing sections 21 and 22 of the two wings 12 and 13 toward their horizontal positions, as seen in dotted lines in Figure 3, from the vertical open positions thereof. Similarly, the pressure medium can be supplied to the cylinders 51 at their opposite ends through the nipples 54 for projecting the piston rods 50 and the racks 49 outwardly from the cylinders 51 for turning the pinion segments 48 in directions to forceably swing the wing sections 21 and 22 of the two wings from their closed horizontal positions to their open vertical positions, as seen in Figure 3. Pressure is maintained on the pistons 52 to maintain the wing sections in either closed horizontal positions or in open vertical positions.

Operation of the rack and pinion means 48, 49 and the clutch 44 may be suitably controlled by means not shown in the cabin 55 of the aircraft. The aircraft 10 is provided with a suitable landing gear, not shown, which when extended will protrude to below the level of the lower wing sections 22, when said wing sections are in depending vertical positions.

From the foregoing it will be readily apparent that the wing sections may be opened as previously described and as illustrated in full lines in Figures 1, 2 and 3, and that the clutch 44 can then be engaged so that the rotors 37 and 41 will be driven in opposite directions by the power source 19 for causing the aircraft 10 to ascend, descend or hover aloft in the same manner as a helicopter. The vertically extended wing sections 21 and 22 will cooperate with the stabilizer 17 to prevent the aircraft from turning about its vertical axis when the rotors are in operation, to any extent that the torque pull of either rotor is not fully counteracted by the other rotor. The rack and pinion means 48, 49 can be operated for closing the wing sections 21 and 22 while the aircraft 10 is aloft and the clutch 44 can be disengaged to stop rotation of the rotors 37 and 41 so that the aircraft can then function as a conventional airplane while in flight. When it is desired to make a landing the wing sections are again opened and the clutch 44 is reengaged so that the aircraft 10 can land as a helicopter. When the wing sections 21 and 22 are closed, as seen in dotted lines in Figure 3, the portions of the rotors 37 and 41 and the guard ring 47 which project from the chamber 33 will be nested snugly in the wing recesses 27, 28 and will in no way interfere with the functioning of said wings or adversely affect the aerodynamic characteristics thereof. Thus, the aircraft 10 constitutes a convertible aircraft in that it is capable of ascending and descending or hovering in the same manner as a helicopter yet is capable of obtaining high speeds while flying as an airplane.

It will be understood that various other means may be utilized for opening and closing the wing sections and for controlling the operation of the rotors.

Various other modifications and changes are contemplated and may be resorted to, without departing from the function or scope of the invention as hereinafter defined by the appended claims.

I claim as my invention:

1. A convertible aircraft including a fuselage and wings disposed on opposite sides of and extending outwardly from the fuselage, each of said wings including an upper wing section and a lower wing section, means swingably connecting the wing sections of each wing to the sides of the fuselage for swinging movement between closed substantially horizontal positions and open substantially vertical positions, actuating means connected to said wing sections for simultaneously moving said wing sections to open or closed positions and for maintaining the wing sections in either open or closed positions, a helicopter unit including a rotor mounted in and protruding from a portion of the fuselage, the sections of each wing having recessed portions opening toward one another when the wings are in closed substantially horizontal positions to form recesses in which portions of the rotor are disposed, said lower wing sections nesting into the upper wing sections, when the wings are closed, to cooperate with the fuselage for completely inclosing said helicopter unit, and means for driving said rotor, operable when the wing sections are in open positions, whereby the portions of the rotor thus exposed will function to sustain the aircraft aloft or to effect ascent or descent of the aircraft, said wings when in closed positions completely inclosing the helicopter unit to enable the aircraft to function as an airplane.

2. In combination with an airplane including a fuselage, a power source for propelling the airplane, and wings extending outwardly from opposite sides of the fuselage for sustaining the airplane while in flight, said wings each including an upper section and a lower section, means swingably connecting said wing sections to the sides of the fuselage for swinging movement of the wing sections between substantially vertical open positions and substantially horizontal closed positions, said wing sections of each wing interfitting in nested relation to one another when in closed positions, said wing sections of each wing being recessed to form a cavity, said fuselage having a chamber opening outwardly of opposite sides thereof into said cavities and combining therewith to form a substantially circular cavity, and a helicopter unit mounted in the fuselage and including rotor means contained within said circular cavity, said rotor means being exposed by movement of the wing sections to substantially vertical open positions.

3. An aircraft as in claim 2, means including a clutch for disengageably connecting said rotor means to the power source for driving the rotor means.

4. An aircraft as in claim 3, said rotor means comprising reversely rotating propellers.

5. An aircraft as in claim 4, and means operable for simultaneously swinging the wing sections of the two wings to either open or closed positions and for maintaining said wing sections in either open or closed positions.

6. An aircraft as in claim 5, and a guard ring secured to the fuselage and disposed around and spaced outwardly from said propellers, said guard ring fitting into said circular cavity when the wing sections are closed.

No references cited.